United States Patent [19]
Wykoff et al.

[11] 4,159,247
[45] Jun. 26, 1979

[54] LOCKING FILTER APPARATUS AND METHOD

[75] Inventors: Richard H. Wykoff, Livonia; John A. Bos, Garden City, both of Mich.

[73] Assignee: AMSTED Industries Incorporated, Chicago, Ill.

[21] Appl. No.: 931,605

[22] Filed: Aug. 7, 1978

[51] Int. Cl.² .............................................. B01D 33/22
[52] U.S. Cl. ....................................... 210/68; 210/387
[58] Field of Search .................... 210/68, 77, 387, 400, 210/445

[56] References Cited

U.S. PATENT DOCUMENTS

| 2,867,326 | 1/1959 | Hirs | 210/387 X |
| 3,722,682 | 3/1973 | Pistiner | 210/387 X |
| 3,826,369 | 7/1974 | Murata et al. | 210/387 X |
| 4,008,158 | 2/1977 | Davis | 210/400 X |

FOREIGN PATENT DOCUMENTS 2306880 2/1973 Fed. Rep. of Germany ........... 210/387

Primary Examiner—William A. Cuchlinski, Jr.
Attorney, Agent, or Firm—Edward J. Brosius; Fred P. Kostka; John L. Schmitt

[57] ABSTRACT

Filter apparatus and method comprising a pair of filter shells having communicating flow passages and a filter media between the shells. Upon the clogging of the filter media, the inflow of liquid is stopped, the shells drained of remaining liquid and separated to allow the filter media to be removed and replaced. The shells can be interlocked when closed, and a mechanism is provided to hold one shell in locked engagement against the other when filtering. The one shell can then be released to allow the shells to separate when the filter media is to be replaced.

6 Claims, 3 Drawing Figures

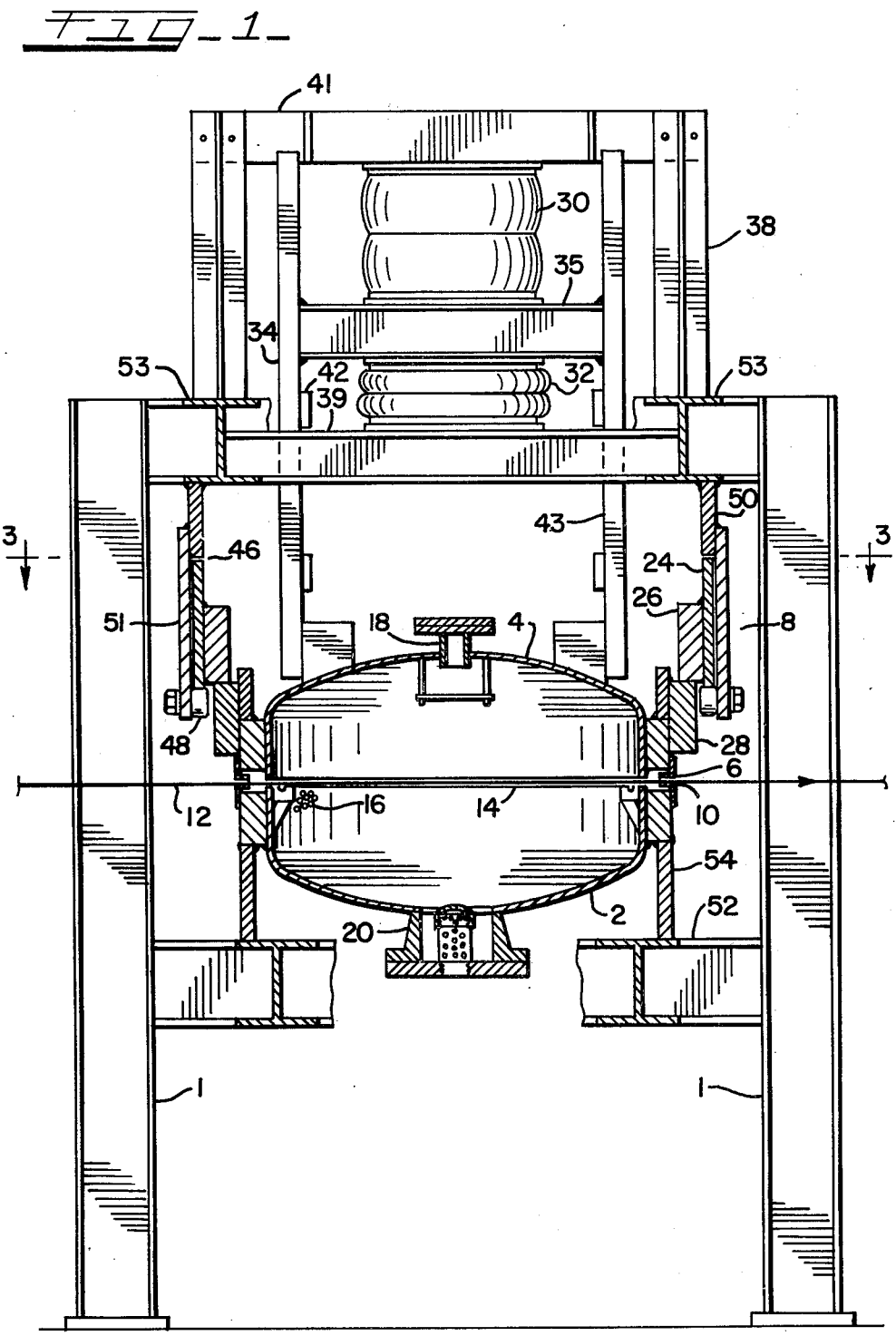

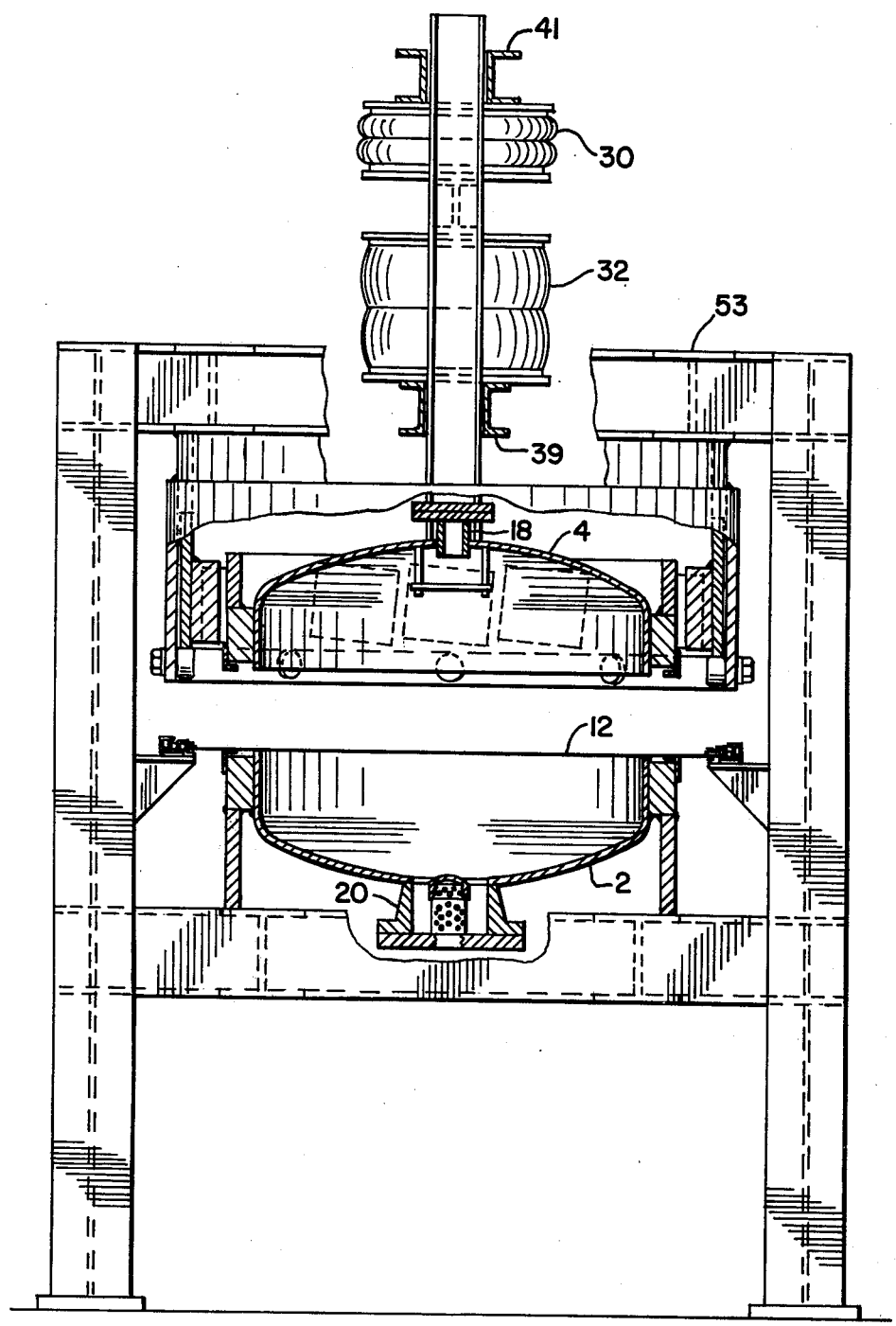
FIG_2

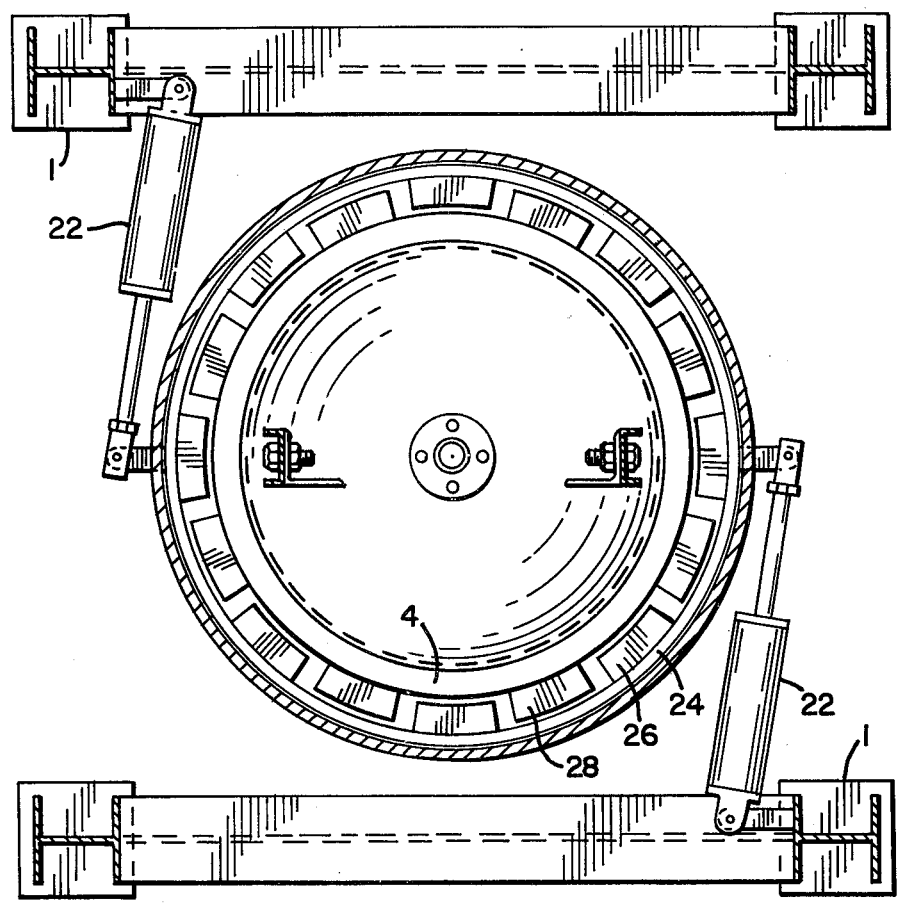
FIG_3

1

LOCKING FILTER APPARATUS AND METHOD

BACKGROUND OF THE INVENTION

Pressure sealed belt filter systems are used to remove solid contaminants from a liquid. Filtration systems which automatically sequence in cutting off liquid inflow, the removal of accumulated solids from the filter media and the replacement of the filter media with a new media are known. Filtration apparatus for use in such systems are shown in U.S. Pat. No. 2,867,326, assigned to the assignee of the present invention. In the apparatus therein disclosed, fluid conducting shells are provided that are capable of sealing a filter medium therebetween. One of the filter shells is movably mounted and actuated by a fluid pressure cylinder to its sealing position. The disadvantage of such an apparatus is the limitation of operating pressure to the resisting capacity of the shell motivating mechanism.

U.S. Pat. No. 3,333,693, also assigned to the assignee of the present invention, discloses a filter apparatus where a movable seal frame is utilized. Two fixed filter shells adequately reinforced by a rigid structure are provided. The seal frame is utilized to confine the filter medium against one of the filter shells. The seal frame is held in position by the actuation of a fluid pressure cylinder. The design is limited to operation at pressures that are within the limit of the structural security of the seal frame and the actuation cylinder.

BRIEF SUMMARY OF THE INVENTION

The present invention provides an apparatus and a method for a pressure sealed belt conveyor system. Two filter shells with communicating flow passages form a filter shell having a filter media therebetween. In the preferred embodiment, the upper filter shell is held in locked engagement against the filter media and the second filter shell by an interlocking apparatus which operates to hold the upper filter shell in contacting engagement with a locking ring and the vertical frame of the apparatus. The upper filter shell is movable on the vertical frame in a vertical direction from the lower filter shell. The locking ring is operated by a rotation device to both lock and unlock the upper filter shell from its contacting engagement with the lower filter shell and filter media. A separation device is provided to move the upper filter shell along the vertical frame. It will be understood that a filter apparatus within the scope of the present invention could include a device wherein the lower filter shell is movable into engagement with the upper filter shell.

It is an object of this invention to provide a pressure sealed belt type filter apparatus that is capable of withstanding pressurized operation due to the positive locking of the filter shells about the filter media.

It is a further object of the present invention to provide a method of filtering wherein a pressure sealed belt filter is capable of withstanding pressurized operation due to the positive locking of the filter shells about the filter media.

BRIEF DESCRIPTION OF THE SEVERAL VIEWS OF THE DRAWING

FIG. 1 is a perspective side view of the filter apparatus of the present invention with the upper filter shell in a lowered position, FIG. 2 is a perspective side view of the filter apparatus of the present invention rotated 90° from the view of FIG. 1 with the upper filter shell in a raised position, FIG. 3 is a top view of the present filter apparatus taken generally along the line 3—3 of FIG. 1, the stop ring shown in an unlocked position.

DESCRIPTION OF THE PREFERRED EMBODIMENT

The filtering apparatus as shown in FIG. 1 includes support legs 1 that are connected by lower support frame members 52 and upper support frame members 53. Usually four support legs 1 are provided. The pressure filter vessel includes two separable sections or filter shells, the upper shell 4 and the lower shell 2. Lower shell 2 is affixed to lower support frame members 52 by support ring 54. Both shells in this embodiment are of a generally cylindrical shape, support ring 54 being annular and surrounding lower shell 2. In the present arrangement, upper shell 4 is directly above lower shell 2 and is vertically movable whereas lower shell 2 is stationary.

Upper shell 4 is supported by lift frame arms 43 that are affixed to the upper surface of upper shell 4 by suitable means such as welding. The arms 43 are part of lift frame assembly 34. Upper support frame members 53 are connected by a fixed lift frame 39. Upper support frame members 53 support an upper frame assembly, which comprises upper frame members 38 affixed to upper support frame members 53. Upper frame members 38 are connected by a top frame member 41 which gives lateral support to upper frame members 38.

A first expandable chamber 30 has an upper side affixed to the lower side of top frame member 41 and a lower side abutting lift frame member 35. Upon the expansion of chamber 30, by means of a source of compressed air (not shown), upper filter shell 4 is lowered into contacting relation with gasket 6 thus forming a flow communicable chamber with lower shell 2. Note that travel blocks 42 affixed to lift frame arms 43 limit the downward travel of upper shell 4 by contacting fixed lift frame member 39.

A second expandable chamber 32 has an upper side contacting the lift frame member 35 and a lower side affixed to the fixed lift frame member 39. Upon the expansion of chamber 32, by means of a source of compressed air (not shown), upper filter shell 4 is raised from its contacting relation with lower shell 2. Of course, as will be explained in greater detail below, the lowering and raising of upper shell 4 is coordinated with the activation and positioning of the locking assembly, shown generally as 8 in FIG. 1.

Locking assembly 8 comprises stop ring support 50 affixed to upper support frame 53 by suitable means such as welding. Attached to stop ring support 50 is stop ring support extension 51. Both stop ring support 50 and stop ring support extension 51 are annular and of a diameter greater than upper shell 4.

Stop ring support extension 51 has provision near the edge thereof away from stop ring support 50 for receiving rollers 48. Usually eight rollers are equidistantly spaced around the circumference of support extension 51. Rollers 48 are usually of the wheel type and are affixed to support extension 51 by any suitable means such as the nut-bolt arrangement shown in FIG. 1.

Supported on rollers 48 is stop ring 24. Stop ring 24 is annular and of a diameter greater than upper shell 4 but less than stop ring support extension 51. Note that the height of stop ring 24 is less than the distance between rollers 48 and the lower portion of stop ring support 50 to allow the rotation of stop ring 24.

Affixed to stop ring 24 are a plurality of stop ring blocks 26. These blocks are arc portions, and, as best seen in FIG. 3, are affixed to and spaced about the inner circumference of stop ring 24 such that space is provided adjacent each stop ring block 26 to receive complementary upper shell stop blocks 28. Upper shell stop blocks 28 are also arc portions, and are affixed to and spaced about the outer circumference of upper filter shell 4.

As seen in FIG. 3, two cylindrical operators 22 are affixed to stop ring 24. The operators 22 are usually hydraulic cylinders, with one end attached to one of the support legs 1 and the other end to stop ring 24. Operators 22 act to rotate stop ring 24 and attached stop ring blocks 26 on rollers 48. As will be explained below, it is the interlocking contact of stop ring blocks 26 and the complementary upper shell stop blocks 28 that acts to lock upper filter shell 4 in sealing engagement with lower filter shell 2.

Returning to FIG. 1, a filter belt 12 extends over the area of the filter and passes through the surface formed by gasket 6 and its mating surface 10. Filter belt 12 is in contact and is supported on supporting screen 14. Supporting screen 14 is carried on an inert fill 16, which fills the lower shell 2 and distributes the forces within the filter equally over the entire area of the pressure barrier formed by the shells 2 and 4. The inert fill 16 of the lower shell is preferably a regular shaped stable solid with a hard smooth surface such as glass beads.

Upper shell 4 has an inlet nozzle 18 and lower shell 2 has an outlet nozzle 20 to form the vessel flow channel. Liquid to be filtered enters inlet nozzle 18 and filtered liquid leaves outlet 20.

Liquid containing suspended solids enters the vessel through nozzle 18, flows downward over the whole area of the filter and passes through the filter belt 12, which is usually constructed of fibrous material forming graded apertures which permit the passage of liquid and restrict the passage of solids, retaining them on the upper surface of filter belt 12. The accumulation of solids on the filter belt will continue to build resistance to flow through the filter, increasing the pressure within the upper shell 4 until this pressure reaches a predetermined maximum, at which point, actuated by a pressure switch (not shown), a mechanically operated valve (not shown) ahead of the filter vessel will stop the influent flow. After the influent valve has closed, a solenoid controlled air valve (not shown) opens to flow compressed air into the upper chamber 4 through nozzle 18 maintaining pressure within the vessel flowing the residual liquid through the filter belt and through the outlet nozzle 20. After the passage of the liquid the continued flow of air will assist in further drying the filtered solids.

After a timed interval, which may be varied depending on the nature of the solid, the solenoid air valve is closed and any residual pressure above atmospheric is vented. With the internal pressure reduced to atmospheric, cylinder operators 22 are actuated to rotate stop ring 24 with stop blocks 26 to a position of clearance with complementary blocks 28 which are affixed to and are a part of upper shell 4.

As shown in FIG. 2, in the clearance position, expandable chamber 30 is vented and expandable chamber 32 is inflated by a solenoid valve controlled flow of air to each. The deflation of expandable chamber 30 and inflation of expandable chamber 32 provides an upward movement of the upper shell 4 through the lift frame assembly 34 attached to upper shell 4 and carried on the upper side of expandable chamber 32. When the upper shell 4 has reached its limit of upward travel, the shell movement actuates a switch (not shown) which starts a drive (not shown) that moves the filter belt 12 with the accumulated solids out of the filter, discharges these solids and advances a clean filter surface into the filter area. The motion of the belt drive actuates a switch (not shown) when the accumulated solids have been discharged and when clean filter surface has been advanced to cover the filter bed. The switch stops the filter belt drive and after a timed pause which assures the belt has come to rest, solenoid valve control (not shown) exhausts the air from expandable chamber 32 and inflates lowering expandable chamber 30 to reseal gasket 6 (FIG. 1) against mating surface 10. The force of lowering expandable chamber 30 against fixed lower shell 2 forces upper shell 4 by means of lift frame assembly 34 down into position compressing gasket 6 to seal the unit. The motion of the upper shell 4 in moving to the closed position actuates a switch (not shown), which actuates air flow to cylinders 22 (FIG. 3) to rotate stop ring 24 to a position where a stop ring stop blocks 26 come to rest against the inclined surface of upper shell stop blocks 28. The downward force of expandble chamber 30 is designed to enable the gasket 6 to be compressed beyond the compression necessary to maintain the seal of the two shells when the internal pressure reaches the design maximum. The amount of compression of gasket 6 is limited by block 42, fixed to the lift frame arms 43 which come to rest against fixed lift frame 39 before the filter is pressurized. The block 42 in limiting the downward motion assures that gasket 6 is not overstressed and assures that a clearance is provided to allow stop ring 24 to move on rollers 48 into position with the inclined faces of stop blocks 26 and 28. On rise of the internal pressure in the filter, upper shell 4 will move against the force exerted by lowering expandable chamber 30 and the movement of upper shell 4 through upper shell stop block 28 will move stop ring stop blocks 26 and attached stop ring 24 against fixed stop ring support 50, forming a stable force system through lower support frame 52 resisting further separation of upper shell 4 from lower shell 2 despite increasing internal vessel pressure.

With the stop ring 24 in the locking position, the flange of the upper shell 4, with stop blocks 26 and 28 and stop ring 24, stop ring support 50, lower support frame 52, support ring 54 and the flange of the lower shell 2, a rigid structure forming spaced holding clamps similar to c-clamps are formed holding the upper shell in place against the fixed lower shell.

Although the preferred embodiment has been described, it will be understood to be within the scope of the present invention to provide a filter apparatus wherein the lower shell is movable into contacting engagement with the upper filter shell.

What is claimed is:

1. In a liquid filtering apparatus, comprising a frame, an upper shell and a lower shell relatively vertically displaceable with respect to each other between an open and a closed position, a filter media interposed between said shells, said upper shell having an inlet for liquid to be filtered and said lower shell having an outlet for filtered liquid, control means to discontinue liquid inflow upon a predetermined increase in pressure within said upper shell, means to cause any liquid remaining within said shells to flow from the filtering apparatus, separation means to separate said two filter shells to said open position, means for intermittently moving said filter media along a path of travel to position a clean portion of said filter media between said shells, said separation means moving said shells to said closed position after said filter media is repositioned, wherein the improvement comprises locking means independent of said separation means comprising rotatable housing means, and complementary locking means on one of said upper or lower shells to maintain said shells in sealing contact about said filter media.

2. The apparatus of claim 1 wherein said upper filter shell is movable in a vertical direction from the lower filter shell along said frame.

3. The apparatus of claim 1, wherein said locking means includes stop blocks affixed to said upper filter shell, stop means affixed to said frame, stop ring means circumscribing said upper filter shell and rotatable within said frame, said stop ring means having stop blocks in complementary relation with said stop blocks of said upper filter shell, and rotation means to rotate said stop ring means to engage the complementary stop blocks and lock said upper filter shell in sealing tight contact with said filter media and said lower filter shell.

4. The apparatus of claim 1, further including two expandable chambers, said chambers being affixed to a portion of said frame and to a second frame portion attached to said upper filter vessel, said chambers so positioned such that upon the expansion of one of said chambers, said upper filter shell is moved into contact with said lower filter shell, and upon the expansion of the other of said chambers, said upper filter shell is moved away from said lower filter shell.

5. In a method of liquid filtering by passing the liquid to be filtered through a filter media interposed between the spaced confronting open faces of a pair of filter shells supported on a vertical frame, liquid to be filtered being introduced under pressure into the first of said shells and filtered liquid exiting from the second of said shells, the first filter shell being locked against the filter media and the second filter shell, interrupting the flow of liquid into said first shell when said filter media becomes clogged, introduction of a compressed gas into the first filter shell to discharge the remaining liquid from the second shell, releasing said gas pressure when the remaining liquid to be filtered has left said second filter shell, unlocking said first filter shell from locked contact with the filter media and second filter shell, moving said first filter shell away from said second filter shell, removing said clogged filter media and accreted contaminant particles from between said shells, moving an unclogged filter media between said shells, moving and interlocking said first filter shell against said filter media and said second filter shell and reinitiating the passing of liquid to be filtered through said filter media, wherein the improvement comprises the interlocking of said first filter shell against said filter media and said second filter shell by the cooperating intermeshing of stop blocks attached to said upper filter shell with complementary stop blocks attached to a stop ring that abuts said vertical frame.

6. The method of claim 5, wherein the interlocking of said first filter shell by the intermeshing of stop blocks is accomplished by the rotation of said stop ring by rotation means.

* * * * *